United States Patent Office 2,795,604
Patented June 11, 1957

2,795,604
SYNTHESIS OF STEROID INTERMEDIATES

Harold Raffelson, St. Louis, Mo., assignor to Monsanto Chemical Company, St. Louis, Mo., a corporation of Delaware No Drawing. Application December 30, 1954,
Serial No. 478,880

11 Claims. (Cl. 260—514.5)

This invention relates to the synthesis of steroids. More particularly this invention relates to the synthesis of 1-($\beta$-carboxyethyl)-2-keto-1,14-dimethyl - $\Delta^{6,10}$ - decahydrophenanthrene

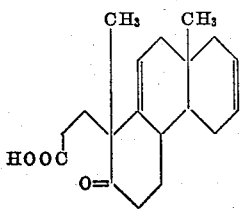

from 1-($\beta$-carboxyethyl)-2-keto-14-methyl-$\Delta^{6,9,11(1)}$-octahydrophenanthrene

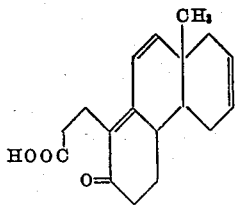

and to new compounds obtained thereby.

The sequence of steps or series of reactions proceeding to the 1-($\beta$-carboxyethyl)-2-keto-1,14-dimethyl-$\Delta^{6,10}$-decahydrophenanthrene for purposes of this invention is outlined schematically as follows:

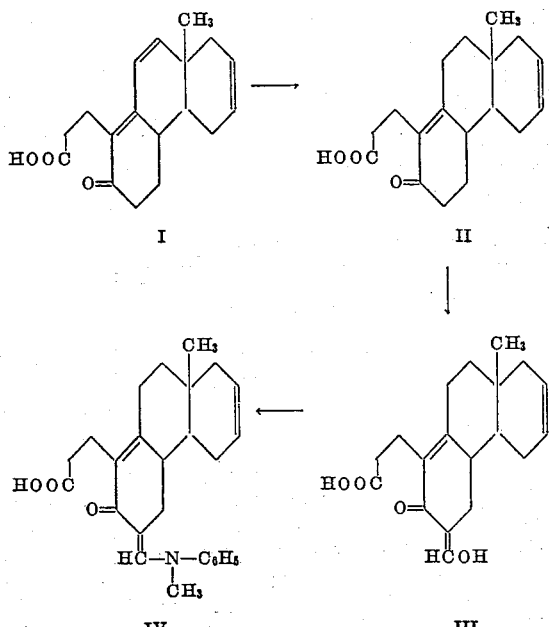

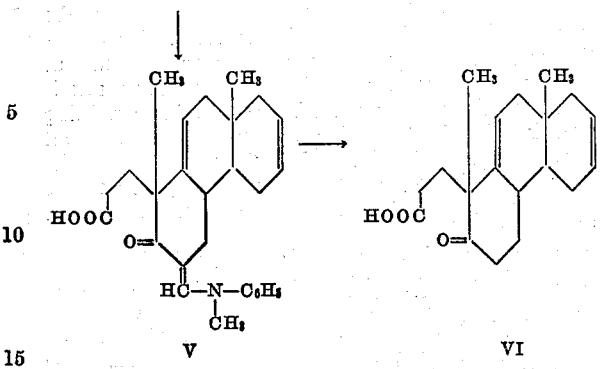

In co-pending application Serial No. 436,718, filed June 14, 1954, of which the instant case in a continuation-in-part, there is described the preparation of 1-($\beta$-carboxyethyl)-2-keto-14-methyl-$\Delta^{6,9,11(1)}$ - octahydrophenanthrene via a two-step process beginning with 1-(hydroxy) methylene - 2 - keto-10-methyl-1,2,5,8,9,10-hexahydromethylene. This procedure may be outlined as follows:

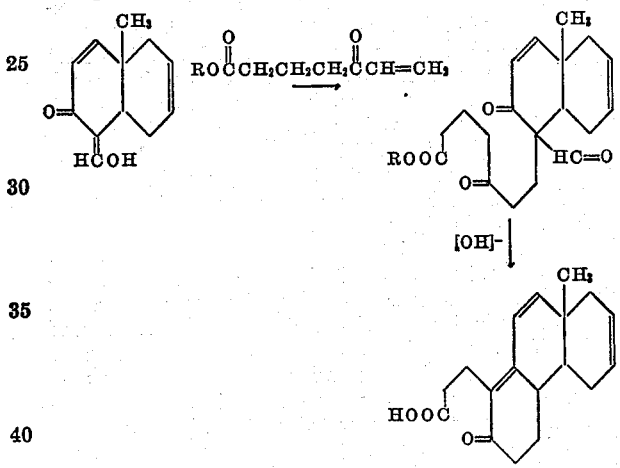

As will be obvious to those skilled in the art 1-($\beta$-carboxyethyl)-2-keto - 14 - methyl - $\Delta^{6,9,11(1)}$ - octahydrophenanthrene contains three asymmetric carbon atoms. As a result thereof such exists in the form of eight optically active isomers or four racemates, i. e. anti-trans, anti-cis, syn-trans and syn-cis racemic mixtures of dextro and levo optically active isomers. All such forms per se or in any combination thereof may be employed in the process outlined herein.

The first step of the process of this invention is the preparation of 1-($\beta$-carboxyethyl) - 2 - keto - 14 - methyl-$\Delta^{6,11(1)}$-decahydrophenanthrene (Compound II) by the addition of one molecule of hydrogen to the 9-10 double bond of 1-($\beta$-carboxyethyl)-2-keto-14-methyl-$\Delta^{6,9,11(1)}$-octahydrophenanthrene (Compound I) without, at the same time, adding hydrogen to the 6-7 double bond and/or the 11-1 double bond. This step is conveniently carried out in a solvent inert with respect to the hydrogenation conditions, as for example a low molecular weight alcohol such as ethyl alcohol, isopropyl alcohol, butanol and like alcohols containing not more than 5 carbon atoms, containing dispersed therein a palladium catalyst until one molar equivalent of hydrogen is absorbed. In its preferred embodiment this step is carried out in a fluid medium comprising a low molecular weight alcohol solution of an alkali metal hydroxide such as that of sodium or potassium. Such a medium may be obtained upon admixing a water-miscible aliphatic alcohol with an alkali metal hydroxide in solid form or in the form of an aqueous solution. In this step palladium is the hydrogenation catalyst and such is employed in any amount sufficient to catalyze the reaction. Although metallic palladium per se is operable, it is preferred that palladium be distributed on a suitable carrier such as activated carbon, alumina, diatomaceous earth, silica, barium sulfate, strontium carbonate, calcium carbonate, magnesium carbonate, and the like, and suspended in the reaction medium. Such catalytic masses are prepared by well known methods, as for example an aqueous solution of a palladium salt is uniformly distributed on a suitable carrier, the mass being then dried, then heated to break down the palladium salt and subsequently heated to reduce the residue to the desired metal oxide, which oxide is then subjected to the expected reaction temperature range in an atmosphere of hydrogen.

The hydrogenation reaction is usually carried out at atmospheric pressure, however, sub-atmospheric pressures may be employed. Although temperatures in the range of 0° C. to 50° C. are particularly convenient, higher or lower temperatures may be employed. The extent of the hydrogenation may be readily followed by observing the decrease in pressure as the hydrogen is absorbed.

As illustrative of this step is the following:

*Example I*

Approximately 19.25 parts by weight of the levo-rotatory isomer of anti-trans - 1 - (β-carboxyethyl)-2-keto-14-methyl-$\Delta^{6,9,11(1)}$-octahydrophenanthrene, M. P. 101–102° C., is admixed in a suitable reaction vessel with approximately 710 parts by weight isopropyl alcohol, approximately 300 parts by weight of water, approximately 30 parts by weight of a 2.74 N aqueous sodium hydroxide solution, and approximately 6 parts by weight of a 2% palladium-strontium carbonate catalyst (which catalyst had been previously reduced). While agitating gaseous hydrogen is passed into the mixture at about 25° C. and at substantially atmospheric pressure. After absorption of substantially one molar equivalent of hydrogen, the catalyst is filtered off and the filtrate is neutralized with sulfuric acid. Upon subjecting the neutralized mass to vacuum distillation the residue is then taken up with benzene and washed with several small portions of water. The layers are separated and the organic layer is subjected to vacuum distillation. A substantially 100% yield of the levo rotatory isomer of anti-trans-1-(β-carboxyethyl)-2-keto-14-methyl-$\Delta^{6,11(1)}$-decahydrophenanthrene is obtained as a white crystalline solid, which solid upon triturating with a mixture of petroleum ether and diethyl ether is found to have a melting point of 113–116° C.

*Example II*

Approximately 19.25 parts by weight of dl-anti-trans-1 - (β-carboxyethyl)-2-keto-14-methyl-$\Delta^{6,9,11(1)}$-octahydrophenanthrene is admixed in a suitable reaction vessel with approximately 710 parts by weight of isopropyl alcohol, approximately 300 parts by weight of water, approximately 30 parts by weight of a 2.74 N aqueous sodium hydroxide solution, and approximately 6 parts by weight of a 2% palladium-strontium carbonate catalyst (which catalyst had been previously reduced). While agitating gaseous hydrogen is passed into the mixture at about 25° C. and at substantially atmospheric pressure. After absorption of substantially one molar equivalent of hydrogen, the catalyst is filtered off and the filtrate is neutralized with sulfuric acid. Upon subjecting the neutralized mass to vacuum distillation the residue is then taken up with benzene and washed with several small portions of water. The layers are separated and the organic layer is subjected to vacuum distillation. A substantially 100% yield of dl-anti-trans-1-(β-carboxyethyl)-2-keto-14-methyl-$\Delta^{6,11(1)}$ - decahydrophenanthrene is obtained.

The second step of the process of this invention is the formylation of 1-(β-carboxyethyl)-2-keto-14-methyl-$\Delta^{6,11(1)}$-decahydrophenanthrene (Compound II) to give a hydroxy methylene of the structural formula

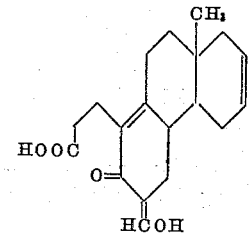

This hydroxy methylene compound (Compound III) is readily prepared by reacting ethyl formate with 1-(β-carboxyethyl)-2-keto-14-methyl - $\Delta^{6,11(1)}$ - decahydrophenanthrene in the presence of sodium methylate.

As illustrative of this step is the following:

*Example III*

To a suitable reaction vessel containing an intimate mixture of about 7.5 parts by weight of sodium methylate, about 88 parts by weight of benzene and about 18.3 parts by weight of ethyl formate is added about 10 parts by weight of the levo-rotatory isomer of anti-trans-1-(β-carboxyethyl)-2-keto-14-methyl - $\Delta^{6,11(1)}$-decahydrophenanthrene (the product of Example I) and the mix so obtained agitated at about 25° C. for 16 hours. The mix is cooled to about 5° C. and thereto is added about 20 parts by weight of water. The mix is agitated for about 30 minutes and the aqueous layer separated and acidified. The acidified aqueous layer is then extracted with several small portions of diethyl ether. The ether extracts upon drying and subjection to vacuum distillation give up a substantially 100% yield of the yellow oily levo-rotatory isomer of anti-trans-1-(β-carboxyethyl)-2-keto-3-(hydroxy) methylene - 14 - methyl-$\Delta^{6,11(1)}$-decahydrophenanthrene.

*Example IV*

To a suitable reaction vessel containing an intimate mixture of about 7.5 parts by weight of sodium methylate, about 88 parts by weight of benzene and about 18.3 parts by weight of ethyl formate is added about 10 parts by weight of dl-anti-trans-1-(β-carboxyethyl)-2-keto-14-methyl-$\Delta^{6,11(1)}$-decahydrophenanthrene (the product of Example II) and the mix so obtained agitated at about 35° C. for 16 hours. The mix is cooled to about 5° C. and thereto is added about 20 parts by weight of water. The mix is agitated for about 30 minutes and the aqueous layer separated and acidified. The acidified aqueous layer is then extracted with several small portions of diethyl ether. The ether extracts upon drying and subjection to vacuum distillation give up a substantially 100% yield of yellow oily dl-anti-trans-1-(β-carboxyethyl)-2-keto-3-(hydroxy) methylene - 14 - methyl-$\Delta^{6,11(1)}$-decahydrophenanthrene.

In the next step of the process of this invention the hydroxy methylene compound (Compound III) is converted to the methyl anilino compound (Compound IV) by condensing with N-methyl aniline.

As illustrative of this step is the following:

*Example V*

To a suitable reaction vessel containing 11.4 parts by weight of the levo-rotatory isomer of anti-trans-1-(β-carboxyethyl)-2-keto-3-(hydroxy) methylene-14-methyl-$\Delta^{6,11(1)}$-decahydrophenanthrene (the product of Example III) dissolved in approximately 45 parts by weight of methanol is slowly added and intimately mixed approximately 20 parts by weight of N-methyl aniline while maintaining the temperature at about 50° C. The mix is agitated for about 16 hours while permitting the temperature to drop to room temperature. The resultant mass is then subjected to vacuum distillation and the residue taken up with diethyl ether. The ether solution is dried giving a substantally 100% yield of yellow oily levo-rotatory isomer of anti-trans-1-($\beta$-carboxyethyl)-2-keto-3-(N-methyl anilino) methylene-14-methyl-$\Delta^{6,11(1)}$-decahydrophenanthrene.

Employing the same procedure as in Example V but replacing the levo rotatory isomer reactant with $dl$-anti-trans-1-($\beta$-carboxyethyl)-2-keto-3-(hydroxy) methylene-14-methyl-$\Delta^{6,11(1)}$-decahydrophenanthrene there is obtained $dl$-anti-trans-1-($\beta$-carboxyethyl)-2-keto-3-(N-methyl anilino) methylene-14-methyl-$\Delta^{6,11(1)}$-decahydrophenanthrene.

In the next step of the process of this invention an angular methyl group is introduced by reacting methyl iodide (or like methylating agents such as dimethyl sulfate, methyl tosylate, etc.) with the corresponding methyl anilino compound (Compound IV). In the introduction of the angular methyl group a new asymmetric carbon atom is introduced which, therefore, provides a mixture of stereoisomers. This mixture (Compound V) is preferably not isolated and separated into its component parts, but converted directly by vigorous base hydrolysis to the corresponding carboxy ethyl derivative (Compound VI). The carboxyethyl derivative so obtained is a mixture of isomeric keto-acids, which isomers for purpose of this invention may be represented structurally and defined as follows:

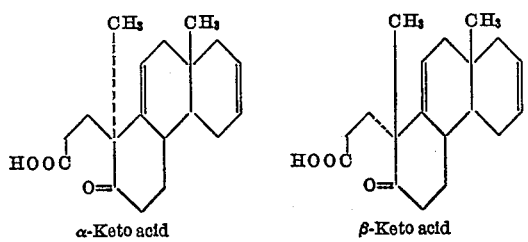

α-Keto acid      β-Keto acid

While both of the isomeric keto-acids may be converted to isomeric 17-formyl-cyclopent-16-eno-10,17-dimethyl-$\Delta^{4,9(11)}$-decahydrophenanthren-3-ones the $\beta$-keto-acid as identified herein produces one whose angular methyl groups are on the same side of the cyclopentanophenanthrene reference plane while the α-keto-acid provides one whose angular methyl groups are on opposite sides of the reference plane.

As illustrative of the preparation of this mixture of keto-acids is the following:

*Example VI*

In a suitable reaction vessel is intimately mixed at room temperature 14 parts by weight of $dl$-anti-trans-1-($\beta$-carboxyethyl)-2-keto-3-(N-methyl anilino) methylene-14-methyl-$\Delta^{6,11(1)}$-decahydrophenanthrene and approximately 5.5 parts by weight of freshly prepared potassium amide. The mix is refluxed for about three hours, cooled to 0° C. and thereto is carefully added 30 parts by weight of methyl iodide in the form of a diethyl ether solution. The mix is agitated for about 16 hours at 0° C. Approximately an equal volume of water is mixed therein, and the aqueous layer separated, acidified, followed by extraction with several small portions of diethyl ether. The ether extracts are combined and the composite extracted with 10% aqueous sodium hydroxide. The alkali extracted material is then refluxed, followed by ether extraction. The ether extracts are combined and acidified. The acidified mass is extracted with diethyl ether, and the ether extracts subjected to vacuum distillation. Approximately 14 parts by weight of an oily mixture of α- and β-keto acids is obtained. Upon taking this mixture up with warm diethyl ether and allowing to stand for about 20 hours, the white crystalline β-keto acid isomer separates leaving the less soluble α-keto-acid in solution.

As illustrative of the conversion of a 1-($\beta$-carboxyethyl)-2-keto-1,14-dimethyl-$\Delta^{6,11(10)}$-decahydrophenanthrene (Compound VI) to the corresponding 17-formyl-cyclopent-16-eno-10,13-dimethyl-$\Delta^{4,9(11)}$-decahydrophenanthren-3-one, the $\beta$-keto-acid (M. P. 171–173° C.) of Example VI is boiled with acetic anhydride in the presence of sodium acetate to provide $dl$-3-keto-$\Delta^{5,9(11),16}$-4-oxa-D-homoandrostatriene (M. P. 99.8–101.2° C.). This enol lactone may be represented structurewise as follows:

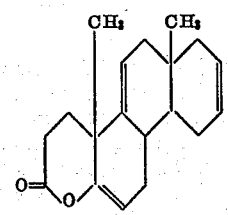

The aforedescribed enol lactone obtained from the $\beta$-keto-acid of Example VI upon reacting with a Grignard reagent in diethyl ether, decomposing the addition product with dilute mineral acid, followed by treating the ether solubles with an alcohol solution of sodium hydroxide provides $dl$-3-keto-$\Delta^{4,9(11),16}$-D-homoandrostatriene (M. P. 147–158° C.) which tetracyclic ketone may be represented structurally as follows:

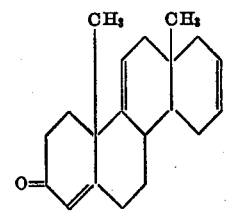

Upon treating $dl$13-keto-$\Delta^{4,9(11),16}$-D-homoandrostatriene with silver acetate and iodine $dl$-3-keto-16,17-dihydroxy-$\Delta^{4,9(11)}$-D-homoandrostadiene (M. P. 215–218° C.) is obtained which glycol upon oxidation with periodic acid followed by heating the reaction mass so obtained in the presence of pyridine acetate provides white crystalline $dl$-$\Delta^{9(11),16}$-bisdehydro-21-norprogesterone (M. P. 178–178.5° C.). Such procedure is described in greater detail in co-pending application Serial No. 362,413, filed June 17, 1953, of W. S. Knowles, now Patent No. 2,760,966.

What is claimed is:
1. 1-($\beta$-carboxyethyl)-2-keto-14-methyl-$\Delta^{6,11(1)}$-decahydrophenanthrene

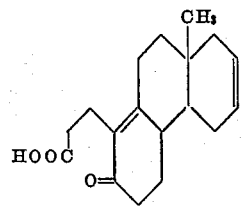

2. 1-($\beta$-carboxyethyl)-2-keto-3-(hydroxy) methylene-14-methyl-$\Delta^{6,11(1)}$-decahydrophenanthrene

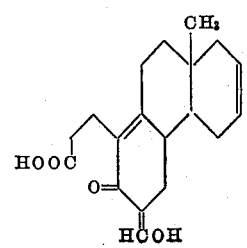

3. 1-(β-carboxyethyl)-2-keto-3-(N-methyl anilino)methylene-14-methyl-Δ⁶,¹¹⁽¹⁾-decahydrophenanthrene

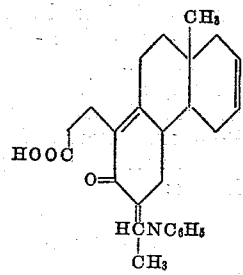

4. The anti-trans isomers of the compound of claim 1.
5. The anti-trans isomers of the compound of claim 2.
6. The anti-trans isomers of the compound of claim 3.
7. The method of making the compound of claim 1 which comprises reacting 1-(β-carboxyethyl)-2-keto-14-methyl-Δ⁶,⁹,¹¹⁽¹⁾-octahydrophenanthrene with one chemical equivalent of hydrogen in the presence of palladium.
8. The method of claim 7 employing a fluid medium comprising a low molecular weight alcohol solution of an alkali metal hydroxide.
9. The method of making the compound of claim 2 which comprises reacting 1-(β-carboxyethyl)-2-keto-14-methyl-Δ⁶,¹¹⁽¹⁾-decahydrophenanthrene with ethyl formate in the presence of sodium methylate.
10. The method of making the compound of claim 3 which comprises reacting 1-(β-carboxyethyl)-2-keto-3-(hydroxy) methylene-14-methyl-Δ⁶,¹¹⁽¹⁾-decahydrophenanthrene with N-methyl aniline in substantially equimolecular proportions.
11. The method of making 1-(β-carboxyethyl)-2-keto-1,14-dimethyl-Δ⁶,¹⁰-decahydrophenanthrene which comprises reacting the compound of claim 3 with a methylating agent and subjecting the methylated product so obtained to vigorous base hydrolysis.

References Cited in the file of this patent
UNITED STATES PATENTS 2,672,482    Woodward  ------------ Mar. 16, 1954
2,681,366    Woodward  ------------ June 15, 1954

OTHER REFERENCES

Woodward et al.: J. A. C. S., vol. 74, p. 4230 (1952).